INVENTORS
ROBERT F. STAMM,
THOMAS MARINER,
BY
ATTORNEY

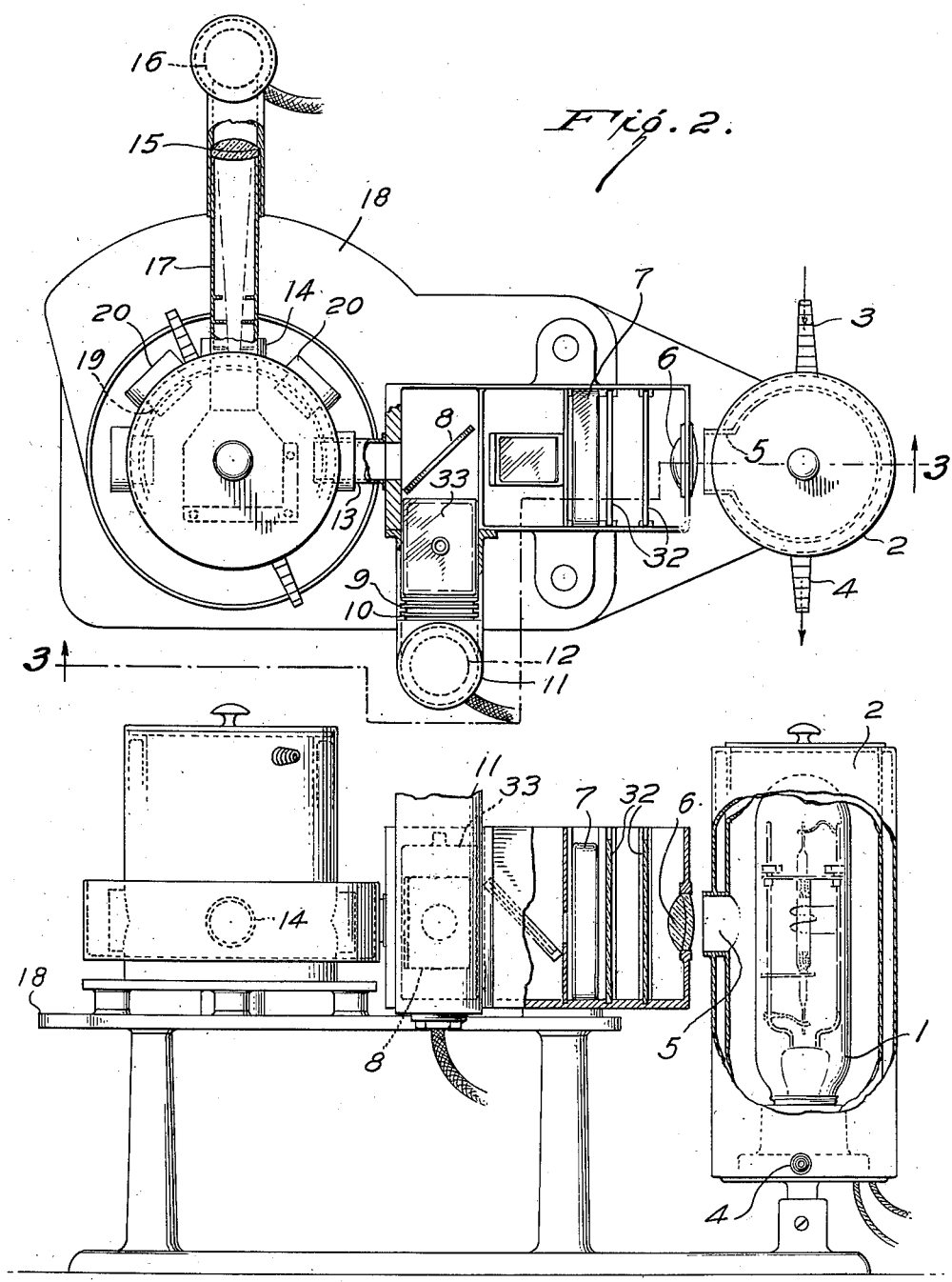

UNITED STATES PATENT OFFICE 2,590,827

TURBIDIMETER

Robert F. Stamm, Stamford, Conn., and Thomas Mariner, Mount Joy, Pa., assignors to American Cyanamid Company, New York, N. Y., a corporation of Maine Application October 29, 1948, Serial No. 57,344

4 Claims. (Cl. 88—14)

This invention relates to an apparatus and method for measuring turbidity and more particularly for the measurement of extremely low degrees of turbidity such as are represented by pure liquids.

The measurement of extremely low turbidities by means of a light scattering effect constitutes an important field. Thus, for example, measurement of turbidity may be used for molecular weight determinations, particle size determinations, approximate particle size shape determinations, and similar precise measurements. It has long been known that turbidity may be measured by the degree of scattering of light in passing through a liquid. This scattering can be measured by observing the degree of attenuation of the directly transmitted beam or by actually measuring the intensities of the light scattered at various angles with respect to the primary beam. The light scattering does not require particles which are relatively of the order of magnitude of a wave length of light. On the contrary, light scattering by dis-continuities of a size and the order of magnitude of molecules takes place, and by suitable measurement the molecular weight of dispersed materials can be determined by measurement of light scattered at right angles to a beam. It is one of the important advantages of this method of molecular weight determination that it is more accurate with very large molecules which is not the case with most other methods of molecular weight determination.

Another advantage of turbidity methods for the determination of molecular weight lies in the fact that these measurements are not affected by ionization which constitutes such a serious problem in the determination of molecular weight of complex molecules by the classical methods.

When the molecules or particles approach the magnitude of a wave length of light, for example, when they exceed about one tenth of the wave length of the light used, it is necessary to apply correction factors to the 90° scattering by measuring the asymmetry of scattering. The problem of measuring the extremely small degree of scattering which is encountered in molecular weight determinations presents a number of problems. The scattered light is of such low intensity that extremely sensitive detectors must be used; for example, electron multiplier phototubes of the 1P21 type. Relatively small errors thus seriously reduce the accuracy of measurement.

The present invention obviates these errors to a large extent by utilizing two photoelectric tubes, preferably two electron multiplier phototubes, one of them receiving scattered light and the other receiving a small fraction of the direct light from a beam passing through a suitable cell. The tubes are connected in a null circuit in such a manner that the load resistance of the tube detecting the scattered light may be linearly calibrated to read scattering coefficient or turbidity directly with a high degree of accuracy over a wide range of values, for example, in the preferred embodiment a range of 4,000 to 1.

It is a further advantage of the invention that by calibrating with a known pure liquid such as benzene, the effect of light path length and other characteristics of the turbidimeter cell may be eliminated.

The extremely low intensity of the scattered light makes an electron multiplier phototube with its amplification of several million almost essential as a light detector. It so happens that the light in the reference beam is of an enormously greater order of intensity and ordinary phototubes can be used. However, in the preferred embodiment of the invention heavy filters are employed in the reference beam in order to reduce the light to a figure which can be easily handled by another electron multiplier phototube. This preferred embodiment permits enjoying the additional advantage of minimizing differential drift in the two tubes. It is quite true that no two electron multiplier phototubes will have absolutely the same rate of drift, but their variations are small compared to the difference in drift in an electron multiplier phototube and an ordinary phototube.

It is another advantage of the present invention that a null method is used so that any differences in sensitivity between electron multiplier phototubes which is unavoidable can be cancelled out and does not affect the accuracy of measurements.

A further advantage of the invention is that fluctuations in the intensity of the light source affects both tubes to the same extent and does not therefore introduce any error in the reading of the instrument.

The source of light used may be any suitable source of intense radiation. However, it is desirable to use a substantially monochromatic light because turbidity varies with changing wave lengths and it is difficult to design reliable polychromatic sources which will not change their intensity distribution through the spectrum.

One of the most convenient sources of intense monochromatic radiation is a mercury arc with suitable filters which select one line, for example, the green line. This is preferred and will be described in detail below. Other sources of radiation may be used. Typical examples are a sodium arc and the helium discharge tube.

The invention will be described in greater detail in conjunction with the drawings in which:

Fig. 2 is a horizontal section through the turbidimeter, and

Fig. 3 is a vertical section along the line 3—3 of Fig. 2.

Figure 1:
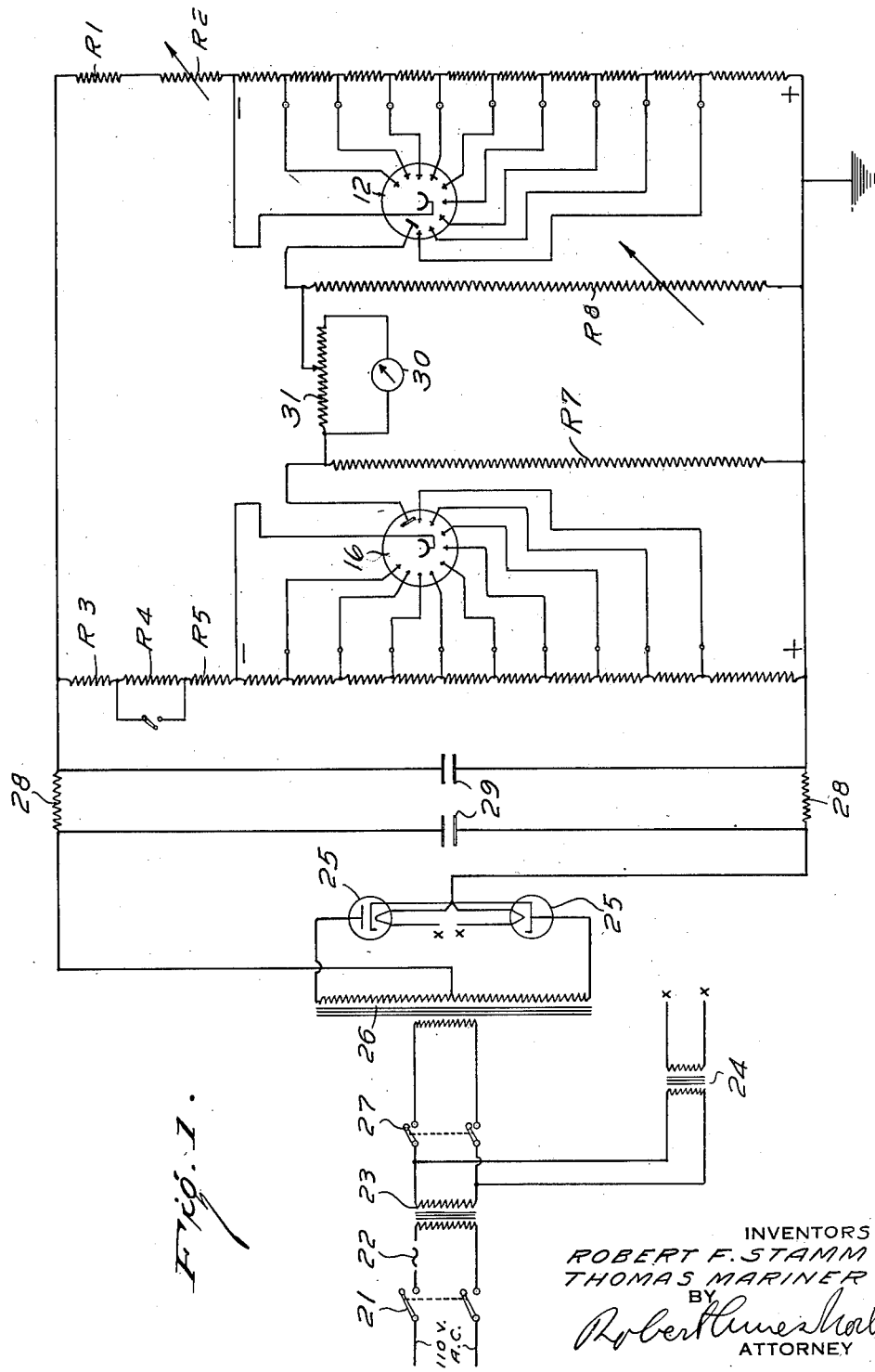
Fig. 1 is the electric circuit.

The turbidimeter is provided with a high intensity mercury arc 1 surrounded by a suitable water-jacketed housing 2 provided with water inlet 3 and outlet 4. A window 5 and lens 6 produce a beam of approximately parallel light which is monochromated by the filter 7 to pass the green line of mercury 5461 Å. The beam strikes two glass plates 32 which introduce vertical polarization to compensate for the horizontal polarization produced when the beam passes through the semi-reflecting mirror 8, a portion being reflected at right angles. The reflected beam passes through an absorption compensating cell 33 which can be filled with the liquid, the turbidity of which is to be measured. After leaving the cell, the reflected beam passes through an aluminized glass filter 9 and ground glass 10 into the phototube housing 11 where it encounters an electron multiplier tube 12. The portion of the beam passing through the semi-reflecting mirror enters the turbidimeter cell through the window 13.

Light scattered at right angles passes out through the port 14 and is focussed by the lens 15 on to a second electron multiplier phototube 16. The housing 17 carrying the lens and phototube is capable of movement in an arc on the framework 18 supporting the cell so that it can be positioned opposite other ports 19 which are at 45° to the port 14. In Fig. 2 these ports are shown as closed by covers 20.

When dealing with liquids which have negligible absorption at the wave length of the light used, such as for example benzene, it is not necessary to fill the cell 33 because the effect of absorption in the turbidimeter cell does not introduce a significant error in the apparatus. However, when maximum precision is desired, the cell may be filled with the liquid. Where a colored liquid is used which is not excessively turbid or when it shows significant light absorption, a correction factor becomes necessary unless the path through which the reflected beam passes is of the same length as that through which the beam passes in the turbidimeter cell. Otherwise, a portion of the reading of the device will be caused by light absorption and will introduce an error in the final reading. When, however, the same light path is used for both beams through the same liquid, the error due to light absorption is satisfactorily compensated. Other devices of compensation may be used, but the liquid cell is the simplest and most rugged and is therefore preferred.

The circuit on Fig. 1 shows a 110 volt A. C. line with a switch 21, fuse 22 and regulating transformer 23. The regulating current feeds a filament transformer 24 which heats the filaments of two half wave high voltage rectifier tubes 25 of the type 2X2. The tubes are connected as a full wave rectifier through the switch 27 and transformer 26. The rectified output is filtered with chokes 28 and condensers 29, the plus voltage being grounded. Two bleeder circuits are formed across the voltage output with resistors $R_1$ and $R_2$ and $R_3$, $R_4$ and $R_5$ respectively, each circuit also containing a tapped resistor to feed the necessary voltage to the nine dynodes of the electron multiplier tubes and to connect to the cathodes. The anodes of the tubes are connected to ground through the resistances $R_7$ and $R_8$, the latter being a decade resistance box giving resistance values from 1 ohm to one million ohms in 1 ohm steps. A sensitive galvanometer 30 with the conventional Ayrton shunt 31 is connected between the anodes.

The operation of the turbidimeter is as follows. The anode currents of the two electron multiplier tubes 16 and 12 for scattered light and direct light have the following relationship when the circuit is adjusted to give a zero reading on the galvanometer 30:

$$i_s/i_o = R_8/R_7$$

Since the ratio of currents is proportional to the ratio of intensities of light striking the tubes, the ratio of scattered light to direct light is proportional to $R_8/R_7$ and, if the latter is kept constant, is proportional to $R_8$, and by suitably adjusting the other constants of the circuit as will be described below, the ratio of scattered light to direct light or the so-called scattering coefficient, may be read directly on the dial of $R_8$.

Turbidity is determined by the equation:

$$I = I_0 e^{-\tau d}$$

when $I$ = transmitted intensity
$I_0$ = incident intensity
$e$ = base of natural logarithms
$\tau$ = the logarithmic decrement of light intensity caused by scattering in all directions
$d$ = path length in sample (cms.)

Since the same cell is used, $d$ is a constant and the turbidity for any scattering coefficient, $$R_{90°}^{x}$$

is obtained by numeration as follows:

$$\tau_x = (16\pi/3) R_{90°}^{x}$$

where $$R_{90°}^{x} = [(I/I_0 r^2)]_{90°}^{x}$$

and $r$ is the distance (in cms.) from a one cm. cube of the substance at which the intensity is investigated.

The following table gives the scattering coefficient and turbidity for benzene for the green line of mercury and for different temperatures within the ordinary range of room temperatures:

| $t$ °C | 16 | 20 | 25 | 28 | 31 |
|---|---|---|---|---|---|
| $10^6 \times R_{5461}^{t}$ | 10.58 | 10.96 | 11.39 | 11.66 | 11.94 |
| $10^4 \times \tau_{5461}^{t}$ | 1.774 | 1.836 | 1.909 | 1.954 | 2.00 |

In starting the operation of the instrument, $R_1$ is selected so as to put the electron multiplier phototube 12 at about 120 volts per dynode stage when $R_2$ is centered. A suitable value is in the neighborhood of 250,000 ohms. This will correspond with the maximum value of $R_2$ of about 100,000 ohms, which in turn will correspond to about 2.5 ma. through the bleeder circuit. The optical filters 9 and 10 are chosen to adjust the anode current of tube 12 to about 0.5 ma. $R_3$ is then selected to put the electron multiplier tube 16 at the same 120 volt per stage with the resistances $R_4$ shunted out and the resistances $R_5$ centered. Suitable values for $R_3$ and $R_5$ read about the same as for $R_1$ and $R_2$. Benzene is then fed into the turbidimeter cell and $R_5$ adjusted to give an anode current for the electron multiplier tube 16 of 20 microamperes. $R_3$ is then set to 11,400 ohms which is equal to $10^9$ times the scattering coefficient of benzene for the green mercury line at 25° C. $R_1$ or $R_3$ is then increased until the galvanometer 30 reads zero. The instrument is now calibrated and can be re-calibrated at any time that tubes are changed or there is any material tube drift.

The substance, the turbidity of which is to be measured, is then put into the turbidimeter cell and $R_3$ adjusted until the galvanometer reads zero. The value of $R_3$ as shown by the dials is one billion times the scattering coefficient.

Minor adjustments in subsequent calibration with benzene may be made by varying $R_5$ or if desired by varying $R_2$ also to keep $R_5$ reasonably centered for convenience. Measurements with an accuracy of about 1% may be made of turbidities from about one twentieth that of benzene up to about 50 times benzene using benzene as a standard. By changing to a new standard having a turbidity about 50 times benzene, the scale can be extended further by lowering the dynode voltages so as to keep $i_s < 1$ ma.

The circuit of Fig. 1 represents a preferred embodiment as it operates both electron multipliers from the same power supply and the balance value with the resistor $R_3$ will be independent of voltage to a high degree because the ratio of output currents will remain substantially constant although the absolute values of the currents may change markedly. The use of a balancing resistance in the form of a rheostat rather than a potentiometer leaves the anode voltage of each amplifier with respect to the last dynode nearly the same if both multipliers are operated at the same number of volts per stage. This insures substantially the same degree of saturation of anode current in each multiplier, and the ratio of currents then becomes substantially independent of the characteristic curve of anode current versus anode voltage. However, it is preferable to operate on the flat portion of the characteristic curve, and the circuit constants are therefore preferably so chosen that a voltage drop of 50 volts in $R_7$ and $R_8$ will not result in operation beneath the flat part of the characteristic curve.

The individual components of the circuit are, of course, illustrative only and other equivalent elements may be used. For example, instead of a voltage regulator and full wave rectifier, a stabilized power supply of the degenerative type may be used or any other of the known equivalent circuits which produce a highly stabilized D. C. output voltage.

We claim:

1. A device for measuring the ratio of scattered light to direct light in a substance comprising in combination a turbidimetric cell, means for passing a beam of light therethrough, means for reflecting a small fraction of said beam before entering the cell, said cell being provided with at least one exit window for scattered light from the beams, electron multiplier phototubes positioned to receive the reflected fraction of the direct light beam and scattered light from the cell respectively, a stabilized source of high voltage D. C. feeding the electrodes of the phototubes through separate bleeder circuits, load resistances in each phototube output circuit, balance indicating means between the anodes of the phototubes, the load resistor in the anode output of the direct light electron multiplier tube being variable and provided with means for indicating its variation, said bleeder circuits being provided with adjustable resistances capable of adjusting phototube currents so that the value of the direct light electron multiplier tube anode load resistor is proportional to the scattering coefficient of the material being measured when the balance-indicating means shows balance, whereby at balance the measurement of the ratio of scattered light to direct light is independent of fluctuations in light beam intensity.

2. A device according to claim 1 in which the turbidimetric cell is provided with three closable windows, one positioned to receive scattered light normal to the light beam and the other two positioned to receive scattered light at equal angles from the normal and means for shifting the electron multiplier phototube from window to window, said means comprising an arm and housing containing the phototube movable about an arc, the center of which lies in the plane of the beam at the intersection with the line from the window receiving scattered light normal to the beam.

3. A device according to claim 2 in which there is included in the path of the reflected direct light beam a chamber adapted to be filled with liquid and having the same path length as that of the beam entering the turbidimetric cell and leaving through the exit window.

4. A device according to claim 1 in which there is included in the path of the reflected direct light beam a chamber adapted to be filled with liquid and having the same path length as that of the beam entering the turbidimetric cell and leaving through the exit window.

ROBERT F. STAMM.
THOMAS MARINER.

REFERENCES CITED

The following references are of record in the file of this patent:

UNITED STATES PATENTS

| Number | Name | Date |
|---|---|---|
| Re. 23,023 | Wolf et al. | Aug. 3, 1948 |
| 1,834,905 | Sheldon | Dec. 1, 1931 |
| 1,971,443 | Exton | Aug. 28, 1934 |
| 1,977,359 | Styer | Oct. 16, 1934 |
| 2,019,871 | Pettingill et al. | Nov. 3, 1935 |
| 2,280,993 | Barnes | Apr. 28, 1942 |
| 2,436,262 | Miller | Feb. 17, 1948 |
| 2,467,057 | Simmon | Apr. 12, 1949 |
| 2,486,866 | Morgan et al. | Nov. 1, 1949 |